United States Patent [19]
Grace

[11] 4,216,416
[45] Aug. 5, 1980

[54] ELECTRONIC VIBRATORY FEED BOWL DRIVER

[75] Inventor: James W. Grace, Cromwell, Conn.

[73] Assignee: Timex Corporation, Waterbury, Conn.

[21] Appl. No.: 947,783

[22] Filed: Oct. 2, 1978

[51] Int. Cl.² ............... B65G 27/32; B65G 43/08; H02K 33/00

[52] U.S. Cl. .................... 318/128; 198/751; 198/762

[58] Field of Search .......... 198/751, 752, 762; 318/127, 128, 132, 130

[56] References Cited

U.S. PATENT DOCUMENTS

| | | | |
|---|---|---|---|
| 2,285,434 | 6/1942 | Hittson | 198/762 X |
| 2,885,617 | 5/1959 | Kast et al. | 318/128 |
| 2,935,672 | 5/1960 | Ross | 198/128 |
| 3,331,239 | 7/1967 | Larsen et al. | 318/128 X |
| 3,826,993 | 7/1974 | White | 318/130 X |
| 3,834,534 | 9/1974 | Peterson et al. | 198/751 X |
| 4,049,997 | 9/1977 | McGhee | 318/128 |
| 4,101,816 | 7/1978 | Shepter | 318/128 X |

*Primary Examiner*—James L. Rowland

[57] ABSTRACT

A vibratory feed bowl driver having sensor for providing a signal responsive to the frequency and amplitude of vibration of a vibratory (parts) feeder and a driver circuit arrangement.

The driver circuit arrangement is responsive to the output signal of the sensor for providing to the bowl's driver coil a variable width drive pulse at the optimum point in the bowl's mechanical cycle to maintain a desired amplitude of bowl vibration at the varying resonant frequencies of the bowl with loading.

3 Claims, 8 Drawing Figures

ELECTRONIC VIBRATORY FEED BOWL DRIVER

BACKGROUND OF THE INVENTION

The present invention relates to a driver arrangement for vibratory feeders.

Typically, vibratory feeders are driven at the A.C. line frequency and, therefore, amplitude adjustment is continuously required with loading variations. The prior art techniques require time consuming tuning procedures to be performed at installation. In addition, tuning to the line frequency or a multiple thereof may not provide the optimum bowl vibration frequency to achieve a maximum feed rate of piece parts and, therefore, is sumptuous of energy.

In contrast to the prior art, the present invention provides a vibratory feed bowl driver which provides to the bowl's drive coil a variable width drive pulse at the optimum point in the bowl's mechanical oscillating cycle to automatically maintain a desired constant amplitude of bowl vibration at the varying resonant frequencies of the bowl with loading.

SUMMARY OF THE INVENTION

According to one embodiment of the invention, a proximity sensor provides an analog output signal indicative of the frequency and amplitude of vibration of a vibratory feeder. A driver circuit arrangement responsive to the analog output signal provides a variable drive pulse to the feeder for maintaining a desired amplitude of bowl vibration at the resonant frequency of the bowl with piece parts loading.

Accordingly, it is an object of this invention to provide a new and improved self-tuning feeder.

A further object of this invention is to provide an apparatus for driving a vibratory feeder which maintains an optimum feed rate over the full piece parts load range of the bowl.

Other objects and advantages of the present invention will be more clearly seen when viewed in conjunction with the accompanying drawings. Like numerals refer to like parts throughout. The pin connections for the specific integrated circuit are provided.

DETAILED DESCRIPTION OF THE INVENTION

Figure 1:
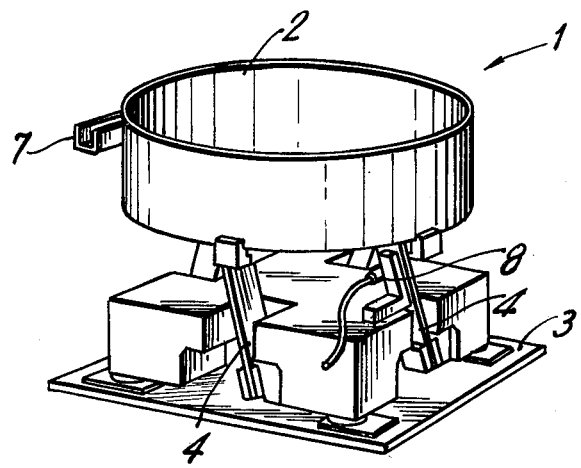
FIGS. 1 and 2 are perspective views of vibratory feeders having a proximity sensor affixed thereto in accordance with the present invention.
Figure 2:
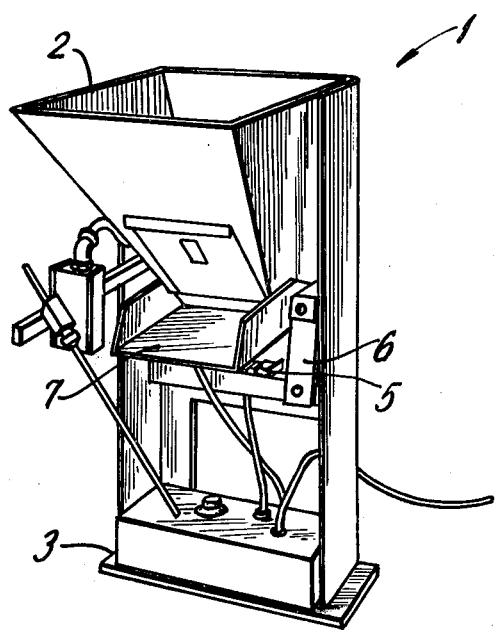
Figure 3:
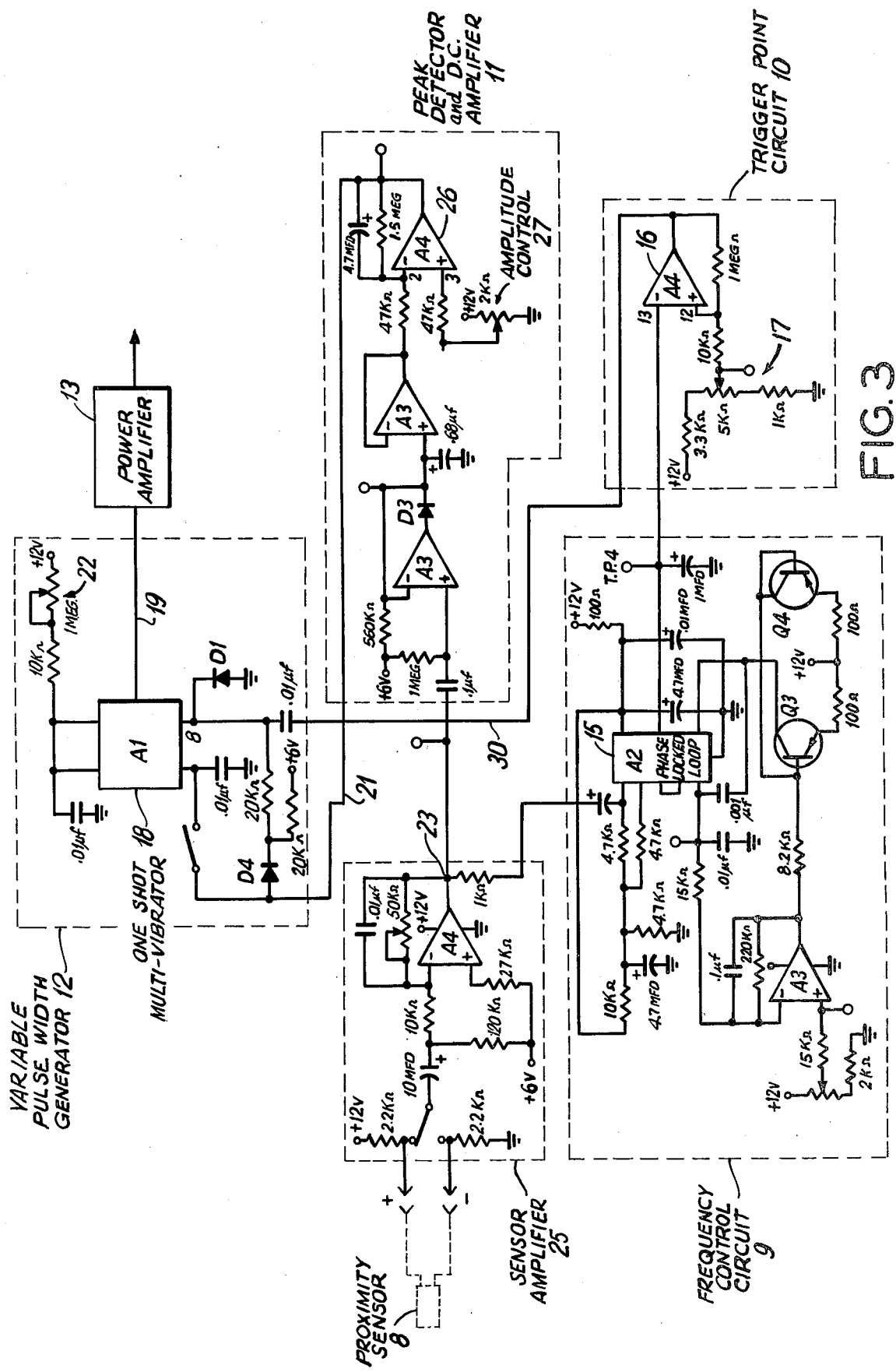
FIG. 3 is a circuit diagram of the driver circuit arrangements.

Referring now to FIGS. 1 and 2 of the drawings, a vibratory parts feeder 1 is shown for handling small parts according to the preferred embodiment of the present invention. Since vibratory feeders are well known to those skilled in the art and are commercially available, for example, from Automation Sales, Inc., P.O. Box 86, Caldwell, N.J., exhaustive details thereof are omitted to avoid prolixity.

Briefly stated, the vibratory feeder 1 comprises a container or bowl 2 for holding the piece parts (not shown), a base 3, a plurality of springs 4 and a motor (not shown) means for oscillating the bowl 2 on the springs. The springs 4 are each connected pivotally at one end to the bowl 2 and at the other end to the base, to support the bowl 2 for oscillating movement with respect to the base. The means for oscillating the bowl 2 comprises, for example, a drive coil or solenoid device 5 which is typically mounted to the base 3 and when impulsed by an electrical (pulse) signal magnetically attracts the armature on the bowl mounting plate in opposition to the bowl spring 6. At the end of the electrical (pulse) signal, the electromagnetic attraction of the bowl 2 is removed and the bowl 2 is returned to its unattracted position under the influence of the spring 6. This sequence is periodically repeated causing the bowl 2 to vibrate and, thereby, to agitate the piece parts for feeding through a chute 7 to a work station (not shown).

In accordance with the preferred embodiment of the invention, a proximity sensor 8 is mounted to the vibratory feeder so as to provide a signal output representative of the frequency and amplitude of vibration of the bowl 2.

With reference to the drawings, the vibratory feeder 1 is actuated by a drive circuit arrangement which consists of a proximity or spring bar sensor 8, a sensor amplifier 25, a frequency control circuit 9, a trigger point circuit 10, a peak detector and D.C. amplifier 11, a variable pulse width generator 12 and a power amplifier 13.

Figure 4A:
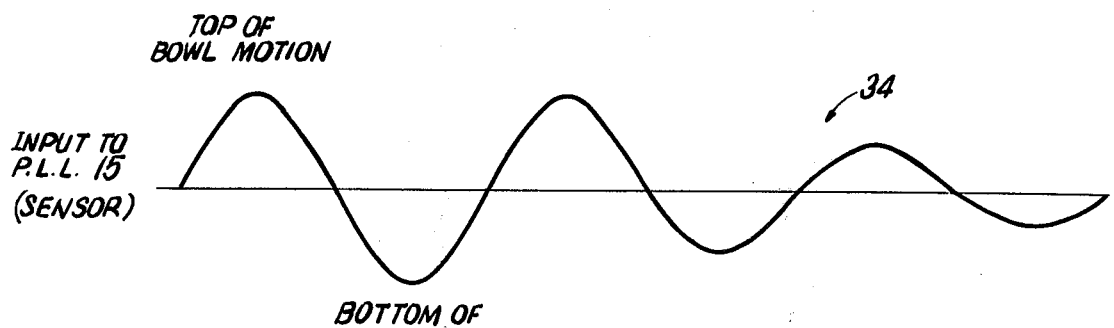
FIGS. 4a, 4b, 4c, 4d and 4e show the relationship between the driver input and output pulses.
Figure 4B:
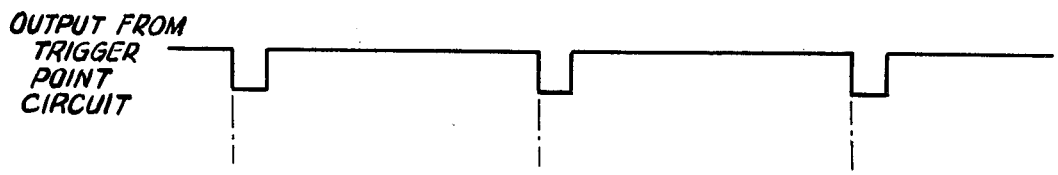
Figure 4C:
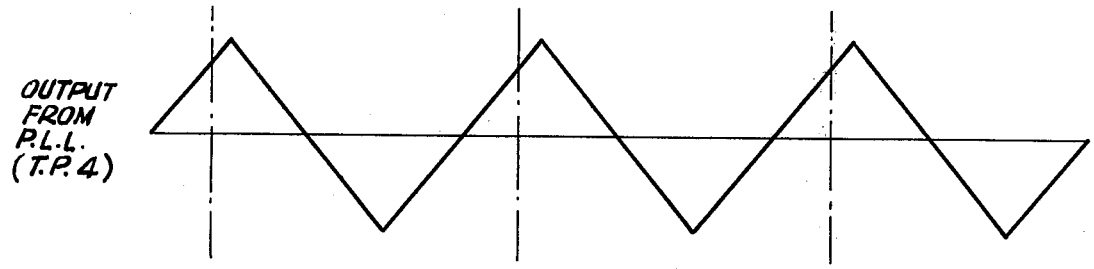

The start-up of bowl 2 vibration is effected at a predetermined selected frequency by an oscillator contained in P.L.L. 15. The phase locked loop circuit 15 provides a constant amplitude triangular wave output as shown in FIG. 4c to an input (pin 13) of comparator 16 of the trigger point circuit 10. During start-up, the trigger point circuit 10, in response to a selected voltage level of the triangular wave provides a trigger pulse to the variable pulse width generator 12, via lead 30. The trigger point, at which the comparator 16 provides the trigger pulse to generator 12, is adjustably determined by the variable resistor network 17. Thus, when the voltage of the rising edge of the triangular wave output from the phase locked loop circuit 15, as shown in FIG. 4c, is equal to or greater than the predetermined voltage level on pin 12 of comparator 16, a trigger pulse is provided to the input (pin 8) of the one shot multi-vibrator 18 of the variable pulse width generator 12. The voltage level on pin 12 of 16 may be selected example, empirically, to correspond to the optimum point in the bowl's oscillating cycle to achieve a maximum bowl 2 amplitude for a preselected bowl and loading condition. Typically this should be approximately in the mid range of the bowl's loading and pulse width range of the generator 12 to permit bi-directional correction from a selected operating condition.

The variable pulse width generator 12 basically consists of one shot multi-vibrator 18 which in response to each trigger pulse (4b) provides a control pulse, via lead 19, to a power amplifier 13. The width of the control pulse (4d) is variable in response to a bowl amplitude detector signal provided to the one shot 18, via lead 21. The width of the control pulse (4d) is initially set for a predetermined bowl and loading condition by the resistor network 22. The control pulse is coupled to a power amplifier 13 which provides a current pulse (4e) to the drive coil of the bowl 2 having a width and/or amplitude responsive to the width of the control pulse. Thus, a change in the bowl's amplitude as shown by wave 34 results in variation of the width of the control pulse, for example, pulse 35, and the corresponding current pulse, for example, as shown by pulse 36. Thus, the drive energy to the bowl is varied to effect remedial action to the bowl's amplitude.

In operation, the sensor 8 provides a signal which is representative of both the amplitude and frequency of oscillation or vibration of the bowl 2 to the sensor amplifier 25. The sensor amplifier 25 in response to the sensor signal provides a sine wave signal (4a) having an amplitude and frequency indicative of the sensor signal and, therefore, bowl's vibration. The sine wave signal (4a) is coupled, via circuit point 23, to the phase locked loop circuit 15 and to the peak detector and D.C. amplifier 11.

The phase locked loop circuit 15 tracks or locks on the frequency of the sine wave signal (4a) and provides a constant amplitude triangular wave (4c) to the trigger point circuit 10. The trigger point circuit 10 provides a trigger pulse (4b) to the one shot 18 at the predetermined voltage level of each constant amplitude triangular wave. In this manner, the drive (current) pulses (4e) to the coil of the bowl 2 corresponds in frequency to the resonant frequency of the bowl's vibration with loading, e.g. with mass change due to variation of the amount of piece parts in the bowl.

Figure 4D:
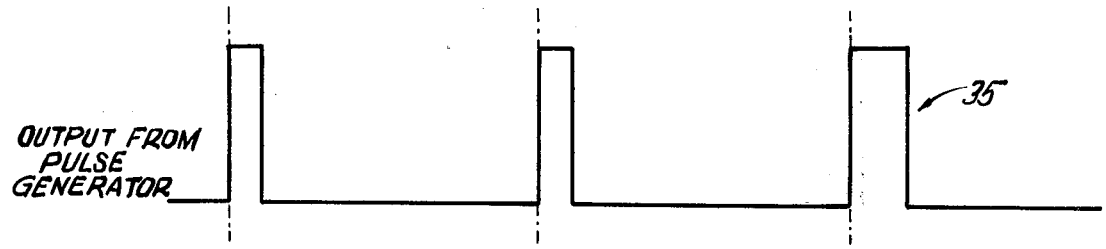
Figure 4E:
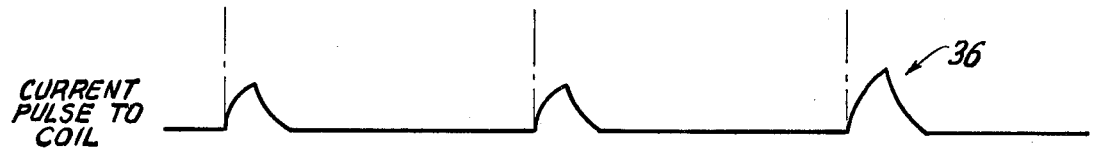

The peak detector and amplifier 11, compares a predetermined desired bowl amplitude signal level coupled to one input (pin 3) of amplifier 26 with a representative signal level of the bowl's actual amplitude on the other input (pin 2) of amplifier 26. The representative signal level of the bowl's amplitude is derived, via the shown circuitry, from the amplitude of the sine wave signal (4a). The amplifier 26 provides a voltage signal, via lead 21, indicative of bowl amplitude deviation from optimum or desired amplitude as set by the amplitude control circuit 27. If the bowl's amplitude decreases as shown by the pulse 34 in FIG. 4a, the corresponding control pulse width 35 and drive (current) pulse width 36 increases as shown in FIGS. 4d and 4e causing greater drive force to be imparted to the bowl. If the amplitude of the bowl increases, for example, due to piece parts being fed to the work station, the control pulse width and/or amplitude and drive (current) pulse width and/or amplitude may be caused to decrease thereby reducing the drive force and amplitude of the bowl until the desired bowl amplitude is achieved. In this manner, remedial action is automatically taken to obtain constant bowl amplitude at the varying resonant frequencies of the bowl over a range of bowl loading conditions.

The following is a list of the logic cirucits used in the preferred embodiment of the invention.

| Symbol Detail No. | Name | Description |
|---|---|---|
| A1 | Duo-Timer | Signetics # NE556A |
| A2 | Phase Locked Loop | Signetics # NE565A |
| A3 & A4 | Quad-Operational Amplifier | National # LM324 |
| Q3 & Q4 | Transistor | Motorola # 2N3906 |
| D1 | Diode | I.T.T. # IN270 |
| D3 & D4 | Diode | G.E. # IN214B |

It is to be understood that the above described arrangements are illustrative of the application of the principles of the invention. Other arrangements may be devised by those skilled in the art without departing from the spirit and scope of the invention.

What is claimed is:

1. Driver circuit arrangement for a vibratory feeder comprising:
   sensor means responsive to the movements of the vibratory feeder for providing a sensor signal indicative of the amplitude and frequency of the vibratory feeder;
   a frequency control circuit means responsive to the sensor signal for providing a constant amplitude triangular wave signal having a frequency substantially equal to the frequency of vibration of the vibratory feeder;
   a trigger point circuit means responsive to the triangular wave signal for providing a trigger pulse occuring substantially at a predetermined oscillation point of the vibratory feeder;
   a detector means responsive to the sensor signal for providing a width control signal indicative of variation from a predetermined amplitude of the vibratory feeder; and
   a variable pulse width generator means responsive to said trigger pulse and said width control signal for providing a variable width drive current pulse(s) to the vibratory feeder having a frequency substantially corresponding to the frequency of said vibratory feeder and occuring substantially at the predetermined oscillation point and having a width for maintaining the amplitude of the vibratory feeder substantially at the predetermined amplitude.

2. Driver circuit arrangement for vibrating a vibratory feeder comprising:
   means coupled to the vibratory feeder for generating a signal indicative of the amplitude and frequency of oscillation of the vibratory feeder;
   drive means responsive to said signal for providing a drive impulse to the vibratory feeder for maintaining a substantially constant preselected amplitude of vibratory feeder oscillation substantially at its resonant frequency with loading variation, said drive means comprising a frequency control circuit responsive to said signal for controlling the frequency of the drive means to correspond to the frequency of the vibratory feeder, a trigger point circuit for causing the drive impulse to occur substantially at a predetermined point in the oscillating cycle of the vibratory feeder, and a peak detector responsive to said signal for providing a width control signal to a variable pulse width generator for controlling said drive impulse to substantially maintain the amplitude of vibratory feeder oscillation.

3. Driver circuit arrangement for vibrating a vibratory feeder comprising:
   means coupled to the vibratory feeder for generating a signal indicative of the amplitude and frequency of oscillation of the vibratory feeder;
   drive means responsive to said signal for providing a drive impulse to the vibratory feeder for maintaining a substantially constant preselected amplitude of vibratory feeder oscillation substantially at its resonant frequency with loading variation, said drive means includes a frequency control circuit having a phase locked loop circuit responsive to said signal for providing a constant amplitude triangular wave at the frequency of the vibratory feeder for controlling the frequency of the drive means to correspond to the frequency of the vibratory feeder, a trigger point circuit having a comparator with a first input coupled to a preselected trigger point voltage and a second input coupled to said triangular wave for providing an output trigger pulse indicative of a predetermined point in the oscillating cycle of the vibratory feeder whereby the drive impulse occurs substantially at the predetermined point in the oscillating cycle of the vibratory feeder, and a peak detector responsive to said signal for providing a width control signal to a variable pulse width generator for controlling said drive inpulse to substantially maintain the amplitude of vibratory feeder oscillation, said peak detector comprises an amplifier having a first input responsive to a preselected amplitude control voltage and a second input responsive to said signal indicative of the amplitude of the vibratory feeder for providing said width control signal.

* * * * *